United States Patent
Takagi et al.

(10) Patent No.: US 8,176,780 B2
(45) Date of Patent: May 15, 2012

(54) ANGULAR VELOCITY SENSOR

(75) Inventors: Makoto Takagi, Kawasaki (JP); Atsushi Kandori, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 587 days.

(21) Appl. No.: 12/371,530

(22) Filed: Feb. 13, 2009

(65) Prior Publication Data

US 2009/0205423 A1    Aug. 20, 2009

(30) Foreign Application Priority Data

Feb. 19, 2008   (JP) ................. 2008-037619

(51) Int. Cl.
*G01C 19/56*   (2012.01)
(52) U.S. Cl. ................ 73/504.14; 73/504.12
(58) Field of Classification Search ........... 73/504.12, 73/504.14
See application file for complete search history.

(56) References Cited

U.S. PATENT DOCUMENTS

| | | | |
|---|---|---|---|
| 5,604,312 A | 2/1997 | Lutz | |
| 5,895,852 A * | 4/1999 | Moriya et al. | 73/504.12 |
| 6,758,983 B2 | 7/2004 | Conant et al. | |
| 6,915,693 B2 | 7/2005 | Kim et al. | |
| 7,026,184 B2 | 4/2006 | Xie et al. | |
| 7,085,122 B2 | 8/2006 | Wu et al. | |
| 7,401,517 B2 * | 7/2008 | Pan et al. | 73/504.16 |
| 2008/0264167 A1 | 10/2008 | Kandori et al. | 73/504.12 |
| 2009/0193893 A1 | 8/2009 | Kandori et al. | 73/504.12 |

FOREIGN PATENT DOCUMENTS

| | | |
|---|---|---|
| JP | 7120266 | 5/1995 |
| JP | 9042973 | 2/1997 |
| JP | 9127148 | 5/1997 |

\* cited by examiner

*Primary Examiner* — John Chapman, Jr.
(74) *Attorney, Agent, or Firm* — Fitzpatrick, Cella, Harper & Scinto

(57) ABSTRACT

An angular velocity sensor includes a supporting substrate, a detecting portion, a displacement detecting portion, a first driving portion, and a second driving portion. The detecting portion is supported by the supporting substrate movably in at least a free direction. The displacement detecting portion detects a displacement of the detecting portion in the free direction. The first driving portion excites a first reference oscillation of at least a portion of the detecting portion so that a first Coriolis' force in the free direction is generated in response to an angular velocity about a first axis. The second driving portion excites a second reference oscillation of at least a portion of the detecting portion so that a second Coriolis' force in the free direction is generated in response to an angular velocity about a second axis.

11 Claims, 13 Drawing Sheets

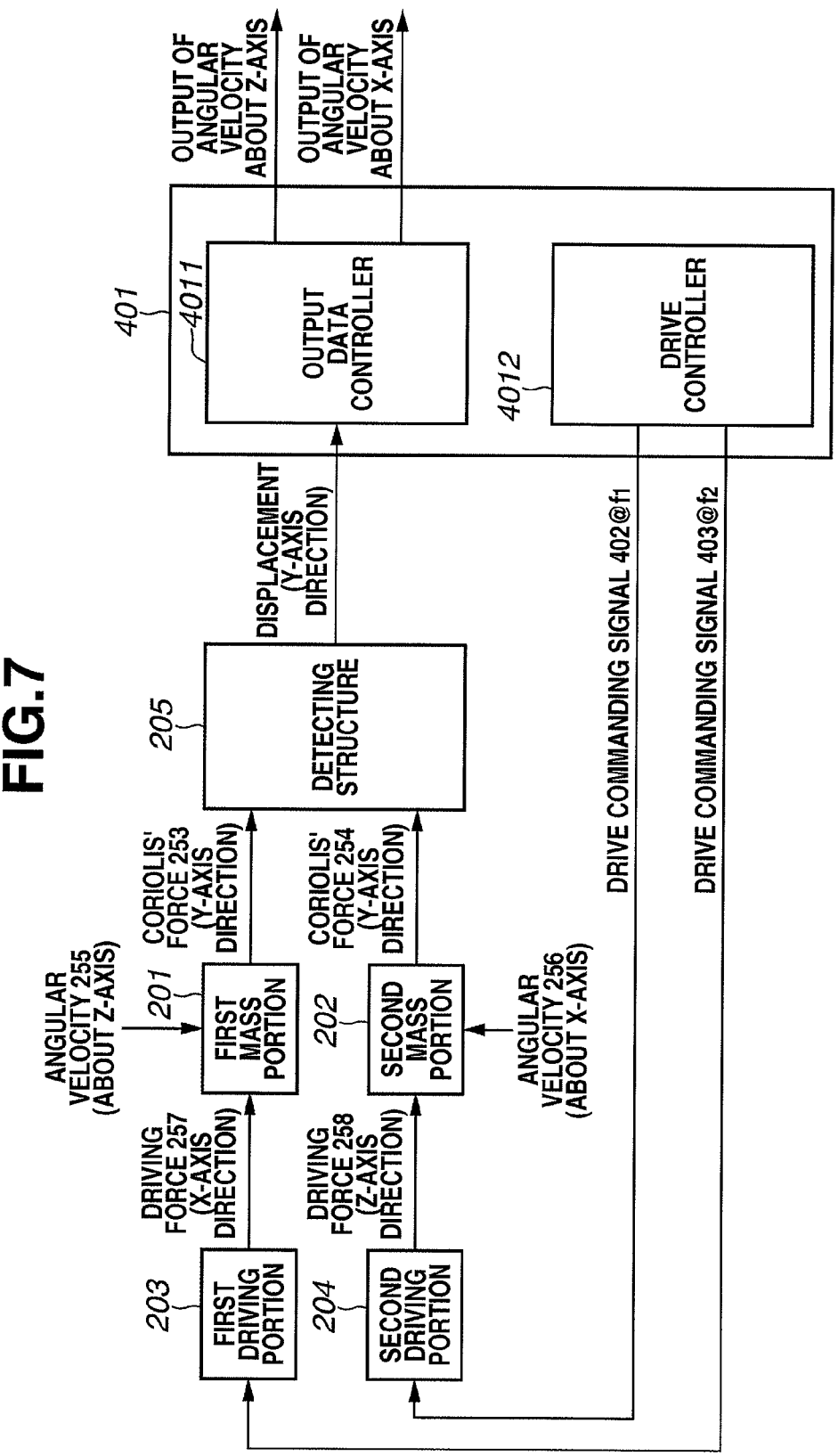

ANGULAR VELOCITY SENSOR

BACKGROUND OF THE INVENTION

1. Field of the Invention

The present invention relates to an angular velocity sensor for detecting an angular velocity about at least an axis. Particularly, the present invention relates to a biaxial angular velocity sensor of an oscillation-type for detecting angular velocities about two axes.

2. Related Background Art

Conventionally, there is a proposal of an oscillation-type angular velocity sensor in which the angular velocity of an object is acquired by detecting Coriolis' force appearing in response to input of an angular velocity into a mass portion performing a reference oscillation. As the sensor of this type, there have been proposed some oscillation-type angular velocity sensors fabricated on semiconductor substrates using techniques of MEMS (Micro-Electro Mechanical Systems).

In general, in the oscillation-type angular velocity sensor using a semiconductor substrate, an angular velocity is obtained by measuring a displacement of a detecting mass portion caused by Coriolis' force appearing in response to input of the angular velocity about an axis perpendicular to the mass portion performing a reference oscillation.

Further, there is a demand in the fields of home appliances, robots and the like for detection of angular velocities about plural axes for controlling motions or operations. To satisfy such demand, angular velocity sensors capable of detecting angular velocities about two axes have been proposed (see JP 1995-120266 A and JP 1997-127148 A). JP 1995-120266 A discloses an oscillation-type angular velocity sensor in which two uni-axial angular velocity sensor structures are disposed on a semiconductor substrate, being shifted from each other by an angular placement of 90 degrees, so that angular velocities about two axes can be measured.

FIGS. 11A and 11B illustrate a schematic structure of the biaxial angular velocity sensor disclosed in JP 1995-120266 A. This sensor includes two oscillators (mass portions) 601 and 602, and two driving portions 603 and 604 that respectively supply driving forces 657 and 658 to the oscillators 601 and 602 to excite reference oscillations 651 and 652 of these oscillators. While Coriolis' forces 653 and 654 are generated in a direction of the same axis, angular velocities 655 and 656 are detected using two systems of detecting electrodes, respectively.

Further, JP 1997-127148 A discloses an oscillation-type angular velocity sensor in which Coriolis' forces in different directions occur in an oscillator in response to angular velocities about two axes, and angular velocities about two axes are obtained by measuring displacements of the oscillator in the directions of Coriolis' forces, respectively.

FIGS. 11C and 11D illustrate the biaxial angular velocity sensor disclosed in JP 1997-127148 A. In each detecting system for detecting each angular velocity about an axis, a driving portion 607 or 608 supplies driving force 677 or 678 to an oscillator (mass portion) 605 or 606 to cause a reference oscillation 671 or 672 of the oscillator 605 or 606. Here, Coriolis' forces 673 and 674 in different directions occur in response to input of angular velocities 675 and 676 about axes, and the oscillator 605 or 606 is displaced in a direction corresponding Coriolis' force 673 or 674. These displacements are measured using two systems including detecting electrodes, respectively.

In the above biaxial angular velocity sensor using the semiconductor substrate, however, a system of a pair of detecting electrodes and a displacement detecting circuit is necessary for each angular velocity detecting axis. Accordingly, a system for performing multi-axis detection needs to include plural pairs of detecting electrodes and plural displacement detecting circuits. Hence, the construction of the system is liable to be complicated.

SUMMARY OF THE INVENTION

It is an object of the present invention to provide an angular velocity sensor having a relatively simple construction.

According to one aspect of the present invention, there is provided an angular velocity sensor which includes a supporting substrate, a detecting portion, a displacement detecting portion, a first driving portion, and a second driving portion. The detecting portion is supported by the supporting substrate movably in at least a free direction (i.e., at least one-dimensional freedom). The displacement detecting portion detects a displacement of the detecting portion in the free direction. The first driving portion excites a first reference oscillation of at least a portion of the detecting portion so that a first Coriolis' force in the free direction is generated in response to an angular velocity about a first axis. The second driving portion excites a second reference oscillation of at least a portion of the detecting portion so that a second Coriolis' force in the free direction is generated in response to an angular velocity about a second axis different from the first axis.

In the angular velocity sensor, typically, the second driving portion excites the second reference oscillation for generating the second Coriolis' force separable from the first Coriolis' force. Further, there can be provided a controlling portion for generating separable signals respectively corresponding to displacements of the detecting portion detected by the displacement detecting portion and respectively caused by the first Coriolis' force and the second Coriolis' force to obtain signals of angular velocities about the first axis and the second axis.

According to the present invention, angular velocities about two axes can be detected by a system including a single detecting portion, leading to simplification of the system of an angular velocity sensor.

BRIEF DESCRIPTION OF THE DRAWINGS

FIG. 7 is a block diagram illustrating a fourth embodiment of a biaxial angular velocity sensor including another dividing/detecting structure.

DETAILED DESCRIPTION OF THE EMBODIMENTS

Figure 1A:
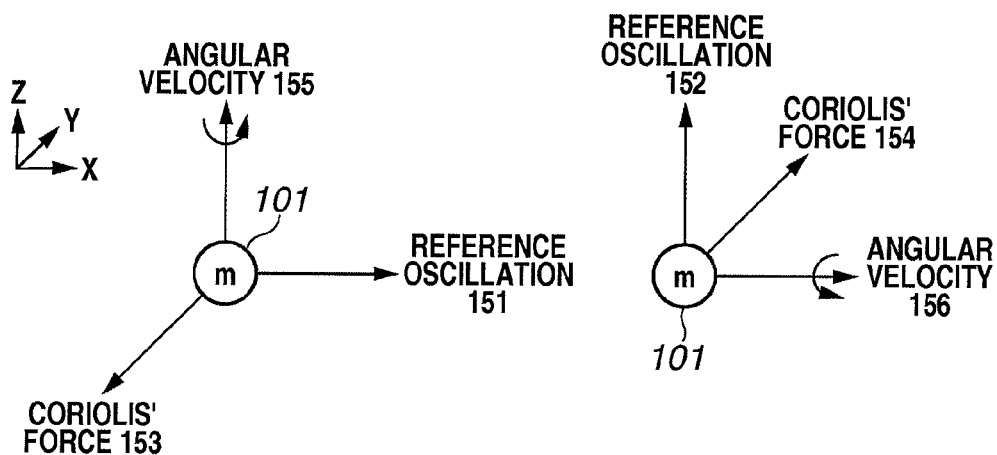
FIG. 1A is a view illustrating directions of reference oscillations, input of angular velocities, and Coriolis' forces in a first embodiment of a biaxial angular velocity sensor according to the present invention.

The present invention is directed to an angular velocity sensor in which a single system including a displacement detecting portion can detect angular velocities about plural axes, and the system is simplified. Inventors of the present invention paid attention to a generation direction of Coriolis' force.

An angular velocity sensor of the present invention includes a detecting portion supported by a supporting substrate movably in at least a free direction, and a displacement detecting portion for detecting a displacement of the detecting portion in the free direction. Further, there are arranged two driving portions for exciting reference oscillations of at least a portion of the detecting portion (i.e., a portion of the detecting portion or the entire detecting portion). Excitation of the reference oscillation in a portion of the detecting portion means that the reference oscillation of the portion is performed relative to the other portion of the detecting portion.

The first driving portion excites a first reference oscillation so that a first Coriolis' force in the free direction is generated in response to an angular velocity about a first axis. The second driving portion excites a second reference oscillation so that a second Coriolis' force in the free direction is generated in response to an angular velocity about a second axis different from the first axis.

In the angular velocity sensor, typically, the second driving portion excites the second reference oscillation for generating the second Coriolis' force separable from the first Coriolis' force. Further, there is provided a controlling portion for separating signals respectively corresponding to displacements of the detecting portion detected by the displacement detecting portion and respectively caused by the first and second Coriolis' forces to detect angular velocities about the first and second axes.

The displacement detecting portion is a combination of detecting electrodes of an electrostatic capacity measuring type in embodiments described below. However, any structure can be used as the displacement detecting portion so long as it can detect a displacement of the detecting portion in the free direction. For example, a piezoelectric resistance or a piezoelectric device can be used. In the case of the piezoelectric device, distortion generated by action of Coriolis' force is detected as a change in voltage. In the case of the piezoelectric resistance, a change in resistance generated by action of Coriolis' force is detected. For example, Coriolis, force can be measured by a structure in which a piezoelectric resistance or a piezoelectric device is disposed on a bar for supporting the detecting portion.

Two reference oscillations are excited in at least a portion of the detecting portion so that action directions of two Coriolis, forces in response to input of angular velocities about two axes are coincident with each other. Accordingly, the detecting portion is displaced in a single direction in response to input of both angular velocities about two axes.

It is thereby possible to obtain angular velocities about two axes with a single system including a displacement detecting portion. Information of detected displacement is divided into separable signals by the controlling portion, and the separable signals correspond to angular velocities about two axes, respectively. Therefore, angular velocities about two axes can be independently detected by the controlling portion. Two reference oscillations need to be executed in divisible different manners so that displacement of the detecting portion in a single direction in response to input of different angular velocities can be divided into separable forms.

Examples of those divisible different manners will be described in third and fourth embodiments described below. It is important that a manner of difference enables division of the displacement. For example, where only a difference in oscillation amplitude is present, the above division is impossible. Accordingly, such a kind of difference cannot be used. At any rate, any kind of difference can be used so long as it makes the above division possible.

However, where a sensor is used only in a state in which both angular velocities about two axes are not simultaneously input into the sensor simultaneously and only one of them is input into the sensor, the sensor can have a structure in which two reference oscillations are excited in indivisible manners. Also in a case where the sum of angular velocities about two axes is desired to be detected, two reference oscillations can be excited in indivisible manners. Such a manner of use is exceptional, and therefore it is assumed that two reference oscillations capable of achieving the above division are performed in the following description.

As described above, the present invention is typically directed to a biaxial angular velocity sensor in which Coriolis' forces occurring in response to angular velocities about two axes are caused to act in a single direction, and information of detected displacement is divided into separable signals to obtain magnitudes of angular velocities about two axes.

Preferred embodiments of the present invention will be hereinafter described with reference to the drawings. Description will be made using orthogonal coordinates with X, Y and Z-axes.

A first embodiment of an angular velocity sensor will be described with reference to FIGS. 1A, 1B, 2A and 2B. In the first embodiment, angular velocities about two axes cause action in a single direction.

FIG. 1A illustrates directions of reference oscillations, input of angular velocities, and Coriolis' forces in the first embodiment. A detecting portion (detecting structure) 101 performs a first reference oscillation 151 in X-axis direction to generate a first Coriolis' force 153 in Y-axis direction in response to input of angular velocity 155 about Z-axis. Similarly, a mass portion or the detecting portion 101 performs a second reference oscillation 152 in Z-axis direction to generate second Coriolis' force 154 in Y-axis direction in response to input of angular velocity 156 about X-axis.

To sum up, X-axis direction is a direction of the first reference oscillation 151, and a direction of input axis of the angular velocity 156 for the second reference oscillation. Similarly, Z-axis is a direction of the second reference oscillation 152, and a direction of input axis of the angular velocity 155 for the first reference oscillation. In contrast thereto, Y-axis is an action direction of the first Coriolis' force 153 in response to input of the angular velocity for the first reference oscillation 151, and an action direction of the second Coriolis' force 154 in response to input of the angular velocity for the second reference oscillation 152.

Thus, action directions of Coriolis' forces 153 and 154 in response to input of different angular velocities about two axes are coincident with each other. In FIG. 1A, the direction of a third axis (Y-axis), which is the action direction of Coriolis' forces 153 and 154, is orthogonal to a first axis (X-axis) and a second axis (Z-axis), which are the two different axes.

Figure 1B:
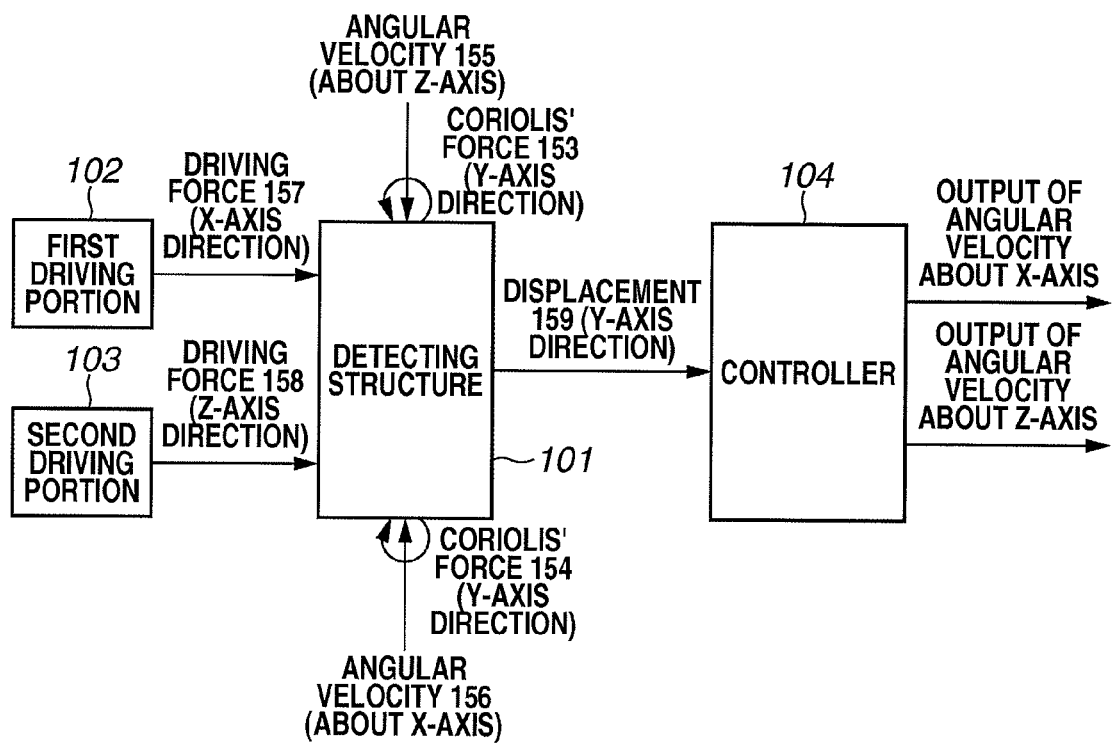
FIG. 1B is a block diagram illustrating the construction of the first embodiment.

FIG. 1B is a block diagram showing the construction of this embodiment. A first driving portion 102 for generating driving force 157 in X-axis direction causes the first reference oscillation 151 of the detecting portion 101. A second driving portion 103 for generating driving force 158 in Z-axis direction causes the second reference oscillation 152 of the detecting portion 101. Upon input of angular velocity 156 about X-axis and angular velocity 155 about Z-axis, first and second Coriolis' forces 153 and 154 in Y-axis direction act on the detecting portion 101. As a result, the detecting portion 101 is displaced in Y-axis direction, and information of displacement 159 is supplied to a controlling portion 104. The controlling portion 104 divides this information into separable signals of angular velocities about two axes, and outputs angular velocity about each axis.

Figure 2A:
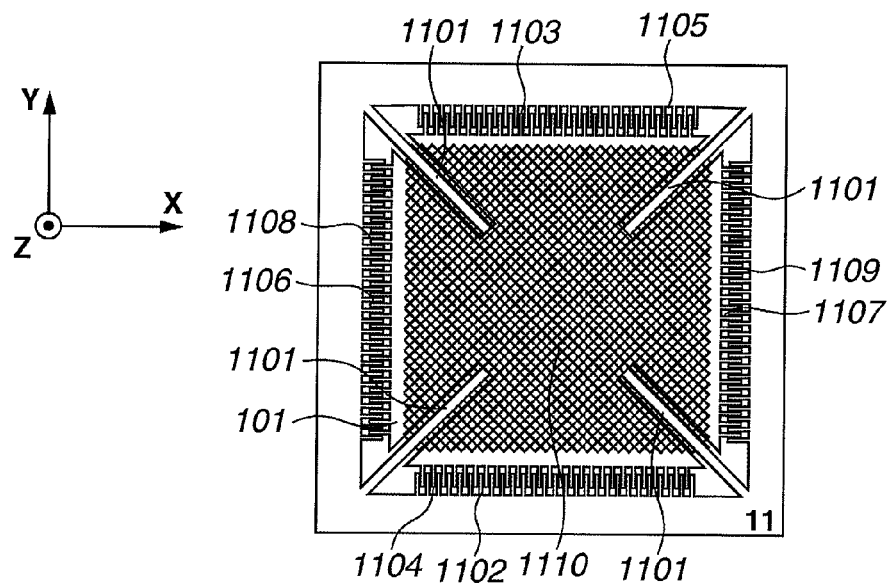
FIG. 2A is a plan view illustrating disassembled portions in a preferable construction of the first embodiment.
Figure 2B:
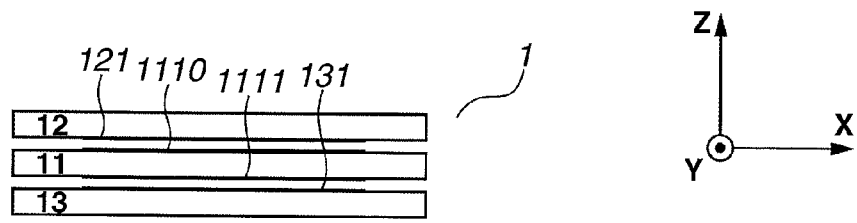
FIG. 2B is a view illustrating substrates in FIG. 2A arranged along a Z-axis direction.

FIG. 2A illustrates a preferable construction of this embodiment. FIG. 2B illustrates the arrangement of substrates 11, 12 and 13 in FIG. 2A along Z-axis direction. In a biaxial angular velocity sensor 1 of this embodiment, the detecting portion 101 is supported by the supporting substrate 11 through springs 1101 movably in directions of X-axis, Y-axis and Z-axis. Movable comb-tooth electrodes 1102 and 1103 movable in Y-axis direction are formed in the detecting portion 101. Facing the movable comb-tooth electrodes 1102 and 1103, stationary comb-tooth electrode 1104 and 1105 are formed in the supporting substrate 11. Further, movable comb-tooth electrodes 1106 and 1107 movable in X-axis direction are formed in the detecting portion 101. Facing the movable comb-tooth electrodes 1106 and 1107, stationary comb-tooth electrodes 1108 and 1109 are formed in the supporting substrate 11. Thus, driving force in X-axis direction is generated. Movable comb-tooth electrodes 1106 and 1107, and stationary comb-tooth electrodes 1108 and 1109 are generally referred to as the first driving portion 102.

Further, movable electrodes 1110 and 1111 are provided on upper and lower surfaces of the detecting portion 101, respectively. Stationary electrode 121 is provided on a lower surface of the supporting substrate 12 above the supporting substrate 11, and stationary electrode 131 is provided on an upper surface of the supporting substrate 13 under the supporting substrate 11. Movable electrodes 1110 and 1111 generate driving force in Z-axis direction together with the facing stationary electrodes 121 and 131, respectively. Movable comb-tooth electrodes 1110 and 1111, and stationary comb-tooth electrodes 121 and 131 are generally referred to as the second driving portion 103.

The detecting portion 101 is caused to execute the reference oscillation 151 in X-axis direction by the driving force 157 in X-axis direction from the first driving portion 102, and Coriolis' force 153 in Y-axis direction is generated in response to the angular velocity 155 about Z-axis. Further, the detecting portion 101 is caused to perform the reference oscillation 152 in Z-axis direction by the driving force 158 in Z-axis direction from the second driving portion 103, and Coriolis' force 154 in Y-axis direction is generated in response to the angular velocity 156 about X-axis.

Both the Coriolis' forces 153 and 154 respectively generated in response to angular velocities 155 and 156 about Z-axis and X-axis cause displacement of the detecting portion 101 in Y-axis direction. Therefore, upon detection of the displacement of the detecting portion 101 in Y-axis direction, the sum of Coriolis' forces in response to angular velocities about two axes can be obtained. In this construction, in order to detect the displacement in Y-axis direction, changes in electrostatic capacity between movable comb-tooth electrodes 1102 and 1103 and stationary comb-tooth electrodes 1104 and 1105 are detected. A displacement detecting portion is comprised of movable comb-tooth electrode 1102 and 1103, and stationary comb-tooth electrodes 1104 and 1105.

The controlling portion 104 divides the thus-detected displacement in Y-axis direction into separable signals of angular velocities about two axes. Accordingly, outputs of angular velocities about two axes can be obtained.

As described in the foregoing, in this embodiment, the detecting portion 101 is supported movably in both directions of the first axis (X-axis) and the second axis (Z-axis). Further, first and second reference oscillations of the detecting portion 101 are caused by first and second driving portions 102 and 103, respectively.

According to this embodiment, since Coriolis' forces due to angular velocities about two axes are caused to act in a direction, angular velocities about two axes can be detected by a single system including the detecting portion, leading to simplification and downsizing of a system of the angular velocity sensor. Further, since the detecting portion 101 does not need to include two mass portions, magnitude of mass per mass portion can be enlarged. Thereby, sensitivity of the oscillation-type angular velocity sensor can be improved.

A second embodiment will be described. First and second reference oscillations discussed in the first embodiment can be achieved by oscillation of a mass portion movably provided in the detecting portion as a portion thereof. In the second embodiment, two mass portions 201 and 202 provided in a detecting portion (detecting structure) 205 perform reference oscillations, respectively. Also in the second embodiment, Coriolis' forces generated in response to input of angular velocities about two axes are caused to act on a common detecting portion. Thus, Coriolis' forces can be detected by a single system including a displacement detecting portion.

Figure 3A:
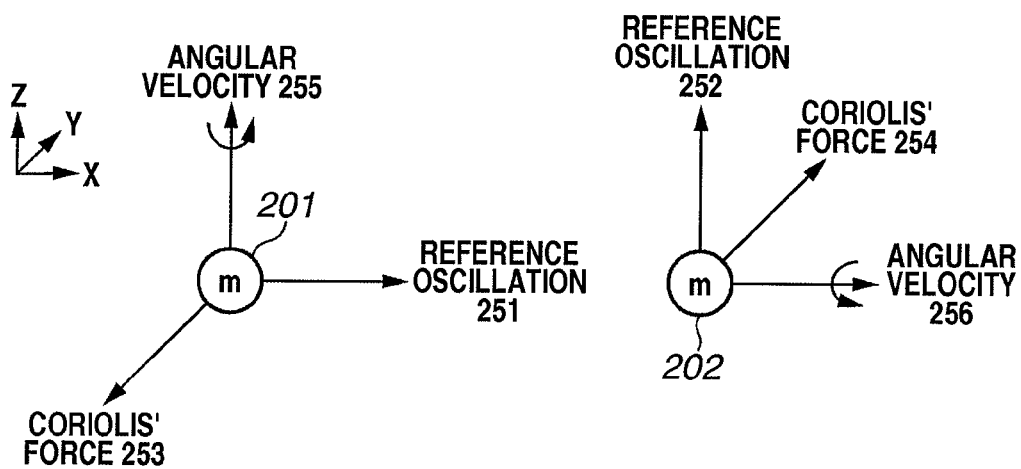
FIG. 3A is a view illustrating directions of reference oscillations, input of angular velocities, and Coriolis' forces in a second embodiment of a biaxial angular velocity sensor according to the present invention.

FIG. 3A illustrates directions of reference oscillations and the like in the second embodiment. First mass portion 201 performs a first reference oscillation 251 in X-axis direction, and a first Coriolis, force 253 in Y-axis (third axis) direction is generated in response to input of angular velocity 255 about Z-axis (first axis). Second mass portion 202 performs a second reference oscillation 252 in Z-axis direction, and a second Coriolis' force 254 is generated in Y-axis direction in response to input of angular velocity 256 about X-axis (second axis). The second embodiment is different from the first embodiment in that first and second mass portions 201 and 202 share reference oscillations in two directions with each other.

Figure 3B:
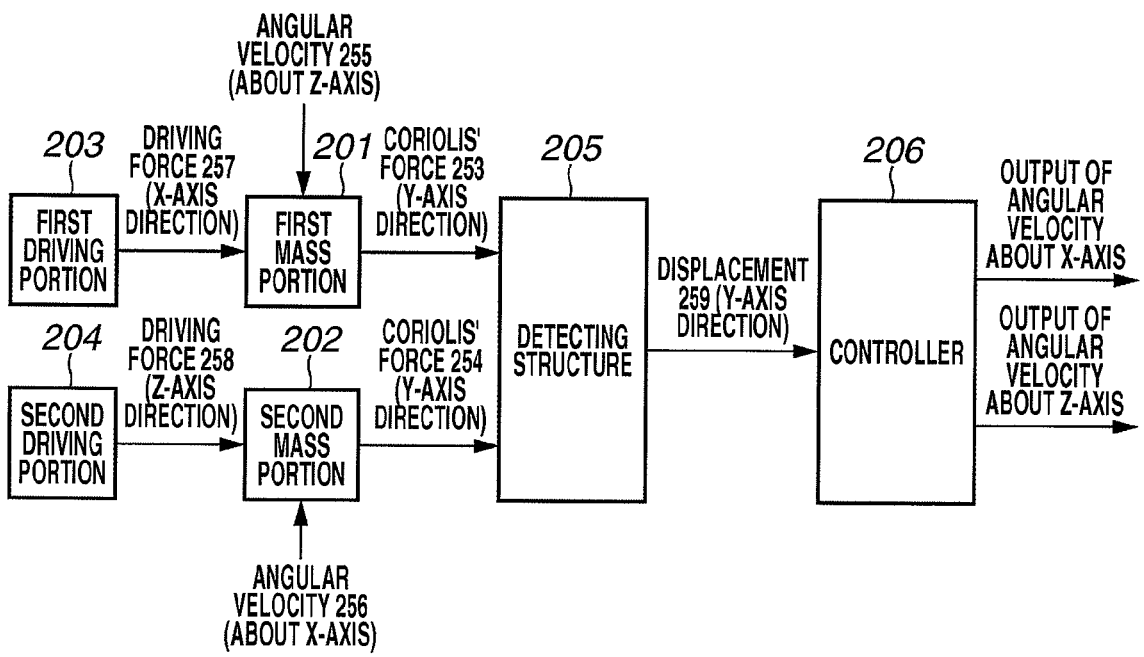
FIG. 3B is a block diagram illustrating the construction of the second embodiment.

FIG. 3B illustrates the construction of a biaxial angular velocity sensor of the second embodiment. First driving portion 203 for generating driving force 257 in X-axis direction causes the first mass portion 201 to perform the first reference oscillation 251 in X-axis direction. Upon input of angular velocity 255 about Z-axis, Coriolis' force 253 in Y-axis direction occurs. Similarly, second driving portion 204 for generating driving force 258 in Z-axis direction causes the second mass portion 202 to perform the second reference oscillation 252 in Z-axis direction. Upon input of angular velocity 256 about X-axis, Coriolis' force 254 in Y-axis direction occurs. Both the Coriolis' forces 253 and 254 occurring in mass portions 201 and 202 act on the detecting portion 205 in Y-axis direction. In this embodiment, the detecting portion 205 is displaced by the amount of displacement 259 in Y-axis direction due to a resultant force of Coriolis' forces 253 and 254 occurring in two mass portions. This embodiment is different from the first embodiment in that two Coriolis' forces appearing due to two reference oscillations of two mass portions act on and displaces the detecting portion 205.

Figure 4:
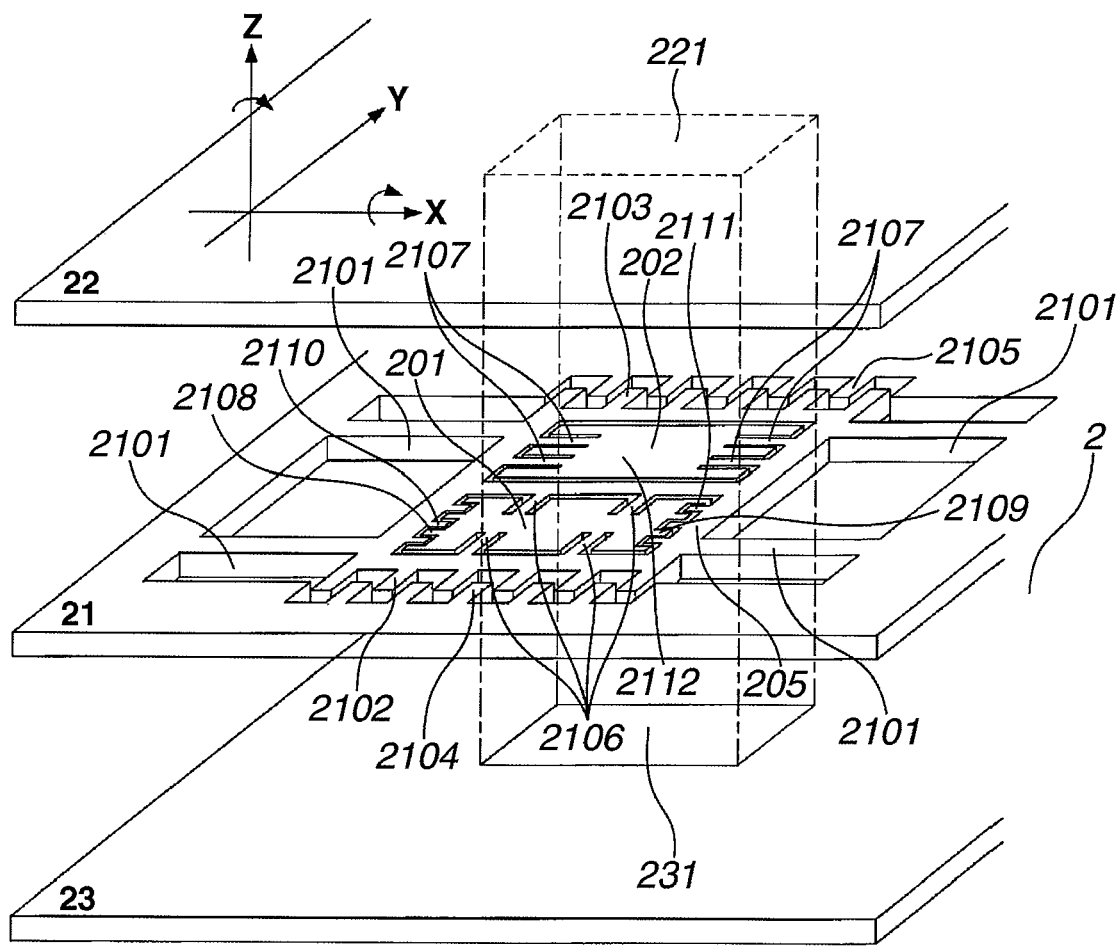
FIG. 4 is a perspective view illustrating disassembled portions in a preferable construction of the second embodiment.

A preferable construction of this embodiment will be described with reference to FIG. 4. In this construction, the detecting portion 205 is supported by a supporting substrate 21 through springs 2101 that are resilient in Y-axis direction while stiff in the other axial directions. Comb-tooth electrodes 2102 and 2103 are provided movably in Y-axis direction in the detecting portion 205. Stationary comb-tooth electrode 2104 and 2105 facing the electrodes 2102 and 2103 are provided in the supporting substrate 21. Further, in the detecting portion 205, there are provided the first mass portion 201 supported by springs 2106 that are resilient in X-axis direction while stiff in the other axial directions, and the second mass portion 202 supported by springs 2107 that are resilient in Z-axis direction while stiff in the other axial directions.

The first mass portion 201 includes movable comb-tooth electrodes 2108 and 2109 that generate the driving force 257 in cooperation with stationary comb-tooth electrodes 2110 and 2111 formed in the detecting portion 205 facing the electrodes 2108 and 2109. Movable comb-tooth electrodes 2108 and 2109, and stationary electrodes 2110 and 2111 are generally referred to as the first driving portion 203. Movable electrode 2112 and movable electrode (not shown) are provided on top and bottom surfaces of the second mass portion 202, respectively. Further, a stationary electrode 221 is provided on a lower surface of a supporting substrate 22 arranged above the supporting substrate 21, and a stationary electrode 231 is provided on an upper surface of a supporting substrate 23 arranged under the supporting substrate 21. Two movable electrodes 2112 generate the driving force 258 together with stationary electrodes 221 and 231 facing the electrodes 2112. Two movable electrodes 2112 and stationary electrodes 221 and 231 are generally referred to as the second driving portion 204.

The first mass portion 201 performs the reference oscillation 251 in X-axis direction due to the driving force 257 from the driving portion 203, and Coriolis' force 253 in Y-axis direction is generated in response to angular velocity 255 about Z-axis. Since the spring 2106 is stiff in Y-axis direction, Coriolis' force 253 is transmitted to the detecting portion 205 from the mass portion 201. Similarly, the second mass portion 202 performs the reference oscillation 252 in Z-axis direction due to the driving force 258 from the driving portion 204, and Coriolis' force 254 in Y-axis direction is generated in response to angular velocity 256 about X-axis. Since the spring 2107 is also stiff in Y-axis direction, Coriolis' force 254 is transmitted to the detecting portion 205 from the mass portion 202. Thus, the detecting portion 205 is displaced in Y-axis direction by Coriolis' forces 253 and 254.

As a result, upon input of angular velocities 256 and 255 about X and Z-axes into the biaxial angular velocity sensor 2, two Coriolis' forces 254 and 253 in Y-axis direction act on and displace the detecting portion 205. Thereby, changes in electrostatic capacity between movable comb-tooth electrode 2102 and stationary electrode 2104 and between movable comb-tooth electrode 2103 and stationary electrode 2105 occur. By detecting the changes in electrostatic capacity, the sum of Coriolis' forces generated in response to angular velocities about two axes can be detected. A controlling portion 206 divides the detected result into separable signals of angular velocities about two axes.

As described in the foregoing, also in this embodiment, the free direction is the third axis (Y-axis) direction different from directions of first axis (Z-axis) and second axis (X-axis). The detecting portion 205 is provided with the first mass portion supported on the third axis movably in the second axis direction, and the second mass portion supported on the third axis movably in the first axis direction. The first driving portion causes the first reference oscillation of the first mass portion, and the second driving portion causes the second reference oscillation of the second mass portion.

In this embodiment, the first axis is orthogonal to the second axis, but other various angles can be formed therebetween. In other words, since Coriolis' force occurs perpendicularly to directions of reference oscillation and input of angular velocity, directions of Coriolis' force and third axis are coincident with each other when the angle between first and second axes is set at an arbitrary value in a plane perpendicular to the third axis. Therefore, it is not always necessary that first and second axes are orthogonal to each other. However, in such a case, input axes of angular velocities to be detected are orthogonal to first and second axes in the plane perpendicular to the third axis, respectively.

For example, a construction in which the first axis is not orthogonal to the second axis can be formed in the following manner. In this construction, a detecting portion is supported by a spring resilient in a direction of the third axis on a plane perpendicular to the third axis. Further, where directions of first axis and second axis are two arbitrary directions in a plane perpendicular to the third axis, the detecting portion includes a first mass portion supported movably in the first axis direction, and a second mass portion supported movably in the second axis direction. A first driving portion causes the first mass portion to perform the first reference oscillation, and a second driving portion causes the second mass portion to perform the second reference oscillation.

Further, this embodiment can be modified as follows. The detecting portion is supported movably also in the second axis direction, and there is provided a mass portion (corresponding to the above-described second mass portion) supported on the third axis movably in the first axis direction. In this modification, the first driving portion causes the detecting portion to perform the first reference oscillation, and the second driving portion causes the mass portion to perform the second reference oscillation. This construction can be considered to include the construction illustrated in FIG. 4. In other words, in the construction of FIG. 4, the detecting portion 205 movable in the third axis direction (Y-axis direction) is modified to include the first mass portion 201 movable in the second axis direction (X-axis direction), and the modified detecting portion is deemed as a new detecting portion. Thus, the new detecting portion 205 and 201 is considered to include the mass portion (second mass portion) 202 supported on the third axis movably in the first axis (Z-axis) direction.

In this embodiment, two mass portions 201 and 202, each of which oscillates in a single direction, share respective reference oscillations in two directions. In other words, two mass portions 201 and 202 oscillate in the respective directions. Upon action of angular velocities, Coriolis' forces caused in two mass portions 201 and 202 act on the detecting portion 205 in the same direction. Here, the Coriolis' forces act on and displaces the detecting portion 205 since two mass portions 201 and 202 cannot move in the direction of the Coriolis' forces. According to this embodiment, each of all springs provided in the angular velocity sensor can be designed to be resilient only in a single direction. That is, each of the mass portions and the detecting portion is movable in a single direction. Therefore, a possibility of detecting angular velocities about other axes as noise can be reduced. Thereby, detection precision of the angular velocity sensor can be enhanced.

A third embodiment will be described. In an angular velocity sensor of the present invention, directions of Coriolis' forces generated in response to angular velocities about two axes are coincident with each other, and a displacement of the detecting portion due to Coriolis' forces is detected by a single system including a displacement detecting portion. Therefore, as a detecting/dividing structure, the controlling portion is provided to obtain angular velocity about each axis in the first and second embodiments. The controlling portion of the third embodiment will be described referring to the structure of the second embodiment. A detecting/dividing method described below can be adopted in other embodiments.

In the third embodiment, two mass portions 201 and 202 are caused to perform reference oscillation alternately, and respective Coriolis' forces appearing in respective mass portions are caused to act on the detecting portion 205 independently from each other. Using such independent action time, each angular velocity about an axis is independently detected. In other words, in this embodiment, angular velocities about two axes are divided into separable signals in a time sharing manner. Such a structure will be described with reference to FIGS. 5 and 6.

Figure 5:
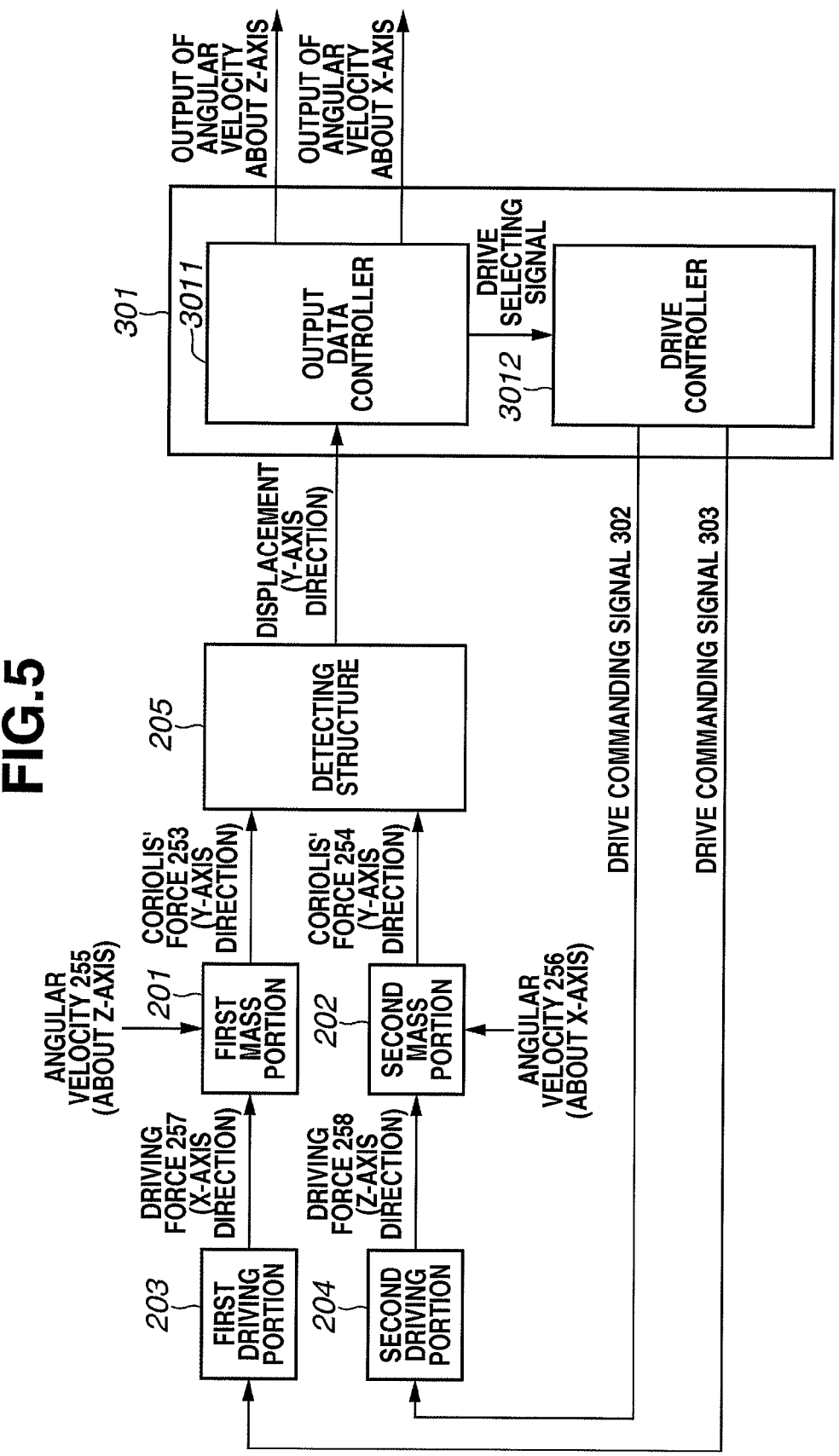
FIG. 5 is a block diagram illustrating a third embodiment of a biaxial angular velocity sensor including a dividing/detecting structure.

FIG. 5 illustrates the detecting/dividing structure of this embodiment. The same functional portions as those in the second embodiment are designated by like reference numerals. The detecting/dividing structure of a biaxial uni-electrode-detecting angular velocity sensor of this embodiment will be described. First and second driving portions 203 and 204 operate according to drive commanding signals 302 and 303 from a controlling portion 301, respectively. The controlling portion 301 includes an output data controlling portion 3011 and a drive controlling portion 3012. The output data controlling portion 3011 supplies an operation selection signal (drive selecting signal) to the drive controlling portion 3012. The operation selection signal changes the operation between first and second driving portions 203 and 204. Upon receipt of the operation selection signal, the drive controlling portion 3012 alternately supplies the drive signal to the first and second driving portions 203 and 204. Thereby, the first and second driving portions 203 and 204 alternately operate to generate driving forces 257 and 258 alternately. As a result, mass portions 201 and 202 are caused to intermittently perform the reference oscillations, respectively.

Then, first Coriolis' force 253 appearing in the mass portion 201 and second Coriolis' force 254 appearing in the mass portion 202 alternately act on the detecting portion 205. Thus, each time the driven mass portion is changed, the output data controlling portion 3011 detects the displacement amount of the detecting portion 205 caused by angular velocity about each axis. Based on information supplied to the drive controlling portion 3012, the output data controlling portion 3011 judges which angular velocity causes the displacement of the detecting portion 205, and outputs a signal of angular velocity about each axis.

Figure 6:
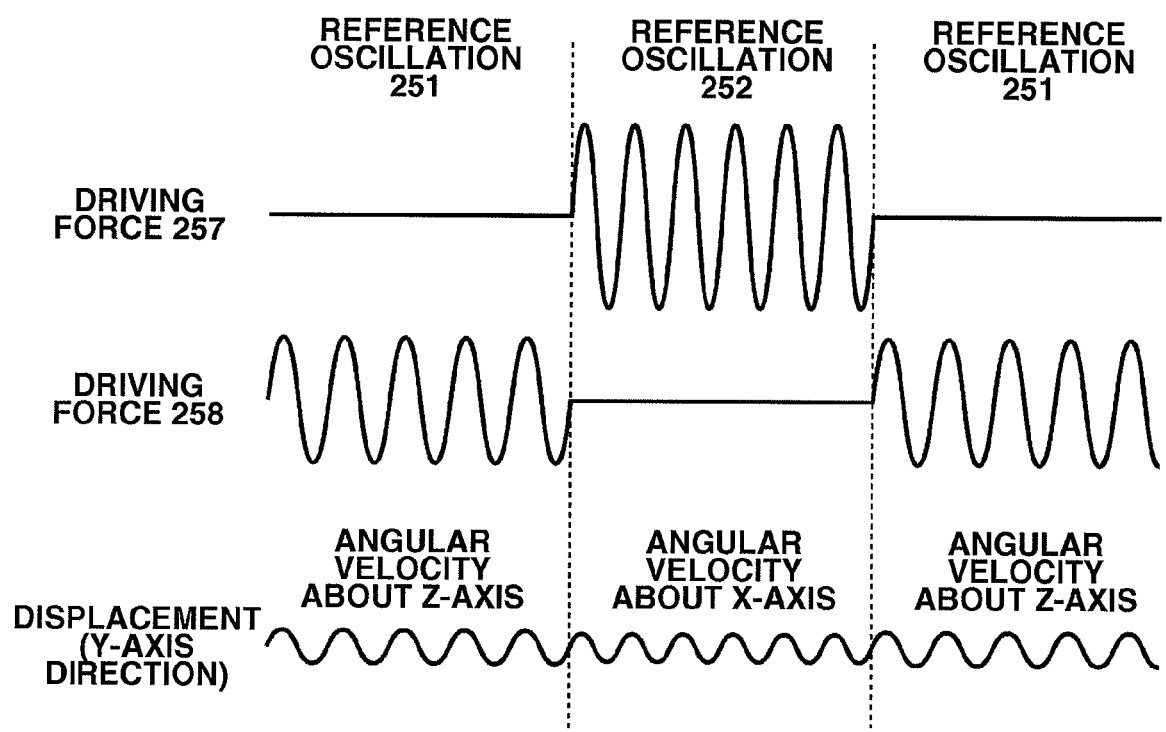
FIG. 6 is a view illustrating application conditions of two driving forces in the dividing/detecting structure, and a change in displacement with time of a detecting portion in the third embodiment.

FIG. 6 illustrates changes with time in application conditions of driving forces 257 and 258, and the displacement (reference oscillation) of the detecting portion 205 in the third embodiment. In response to an interchange of operation of the driving portions 203 and 204, angular velocities about different axes alternately cause the displacement in Y-axis direction. Thus, in this embodiment, displacements due to angular velocities about different axes intermittently appear along the time axis, and are detected.

As described in the foregoing, in this embodiment, the controlling portion 301 includes the output data controlling portion 3011 and the drive controlling portion 3012, and the output data controlling portion 3011 supplies the drive selecting signal to the drive controlling portion 3012 so that first and second reference oscillations are alternately excited. And, based on information of selected reference oscillation, signals of angular velocities about two axes are divided into separable forms. Thus, the controlling portion 301 obtains signals respectively corresponding to displacements caused by first and second Coriolis' forces and detected by the displacement detecting portion, and signals of angular velocities about first and second axes are separately acquired.

The controlling portion 301 of a signal processing portion can be constructed by a digital processing unit such as a CPU, for example. According to this embodiment, mutual interference between oscillations generated in two mass portions 201 and 202 can be reduced, and Coriolis' forces 253 and 254 appearing in two mass portions can be separated by a simple construction.

In this embodiment, a step of driving one of two mass portions and a step of driving the other are alternately arranged along the time axis. However, a third step of stopping both drives can be provided. By such construction, interference between oscillations appearing in two mass portions 201 and 202 can be further reduced. Accordingly, it is possible to readily construct an angular velocity sensor in which angular velocities about two axes can be detected through the displacement in a single axial direction.

Further, it is preferable to differentiate resonance frequencies of two mass portions 201 and 202 when mass portions 201 and 202 are driven in a resonance manner. Thereby, interference between oscillations appearing in two mass portions can be further reduced.

Further, in the case of non-resonance driving, in order to reduce adverse influence on a non-driven mass portion other than the driven mass portion, it is preferable to set the driving frequency away from the resonance frequency of such non-driven mass portion. Thereby, unnecessary reference oscillation in mass portions can be further reduced, and the detection accuracy can be improved.

A fourth embodiment will be described. In this embodiment, two mass portions 201 and 202 are driven at different frequencies, respectively. Accordingly, respective mass portions generate Coriolis' forces at mutually different frequencies. The controlling portion separates the sum of these Coriolis' forces detected by the detecting portion 205 based on the different frequencies to detect angular velocities about two axes. A detecting/dividing structure will be described with reference to FIGS. 7 and 8. Using the structure of the second embodiment, a construction of the controlling portion of the fourth embodiment will be described. A detecting/dividing method of this embodiment described below can also be used in other embodiments.

FIG. 7 illustrates the detecting/dividing structure different from that described in the third embodiment. In this embodiment, a controlling portion 401 includes an output data controlling portion 4011 and a drive controlling portion 4012. In response to a commanding signal 402 from the drive controlling portion 4012, the driving portion 203 drives the first mass portion 201 at first frequency $f_1$. Similarly, in response to a commanding signal 403 from the drive controlling portion 4012, the driving portion 204 drives the second mass portion 202 at second frequency $f_2$. The two driving portions 203 and 204 simultaneously supply driving forces. Here, Coriolis' force 253 occurring in the first mass portion 201 is detected as the amplitude of a wave at first frequency $f_1$, and Coriolis' force 254 occurring in the second mass portion 202 is detected as the amplitude of a wave at second frequency $f_2$. In the detecting portion 205, a displacement in Y-axis direction appears according to the sum of angular velocity detected by the first mass portion 201 and angular velocity detected by the second mass portion 202.

The output data controlling portion 4011 calculates power for each frequency from the displacement data of the detecting portion 205, and divides Coriolis' forces occurring in two mass portions 201 and 202 into separable forms.

Figure 8A:
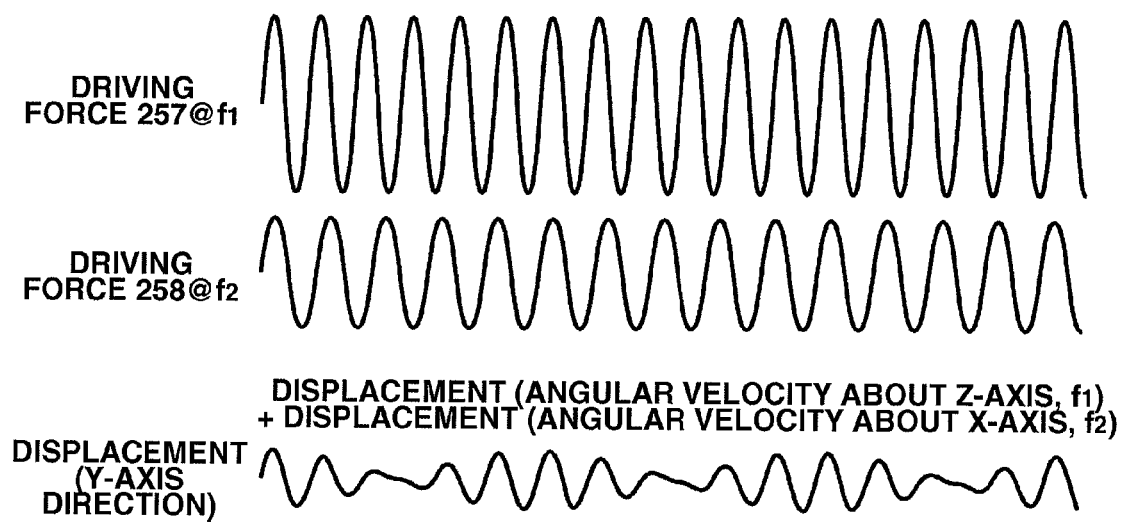
FIG. 8A is a view illustrating application conditions of two driving forces in the dividing/detecting structure, and a change in displacement with time of a detecting portion in the fourth embodiment.
Figure 8B:
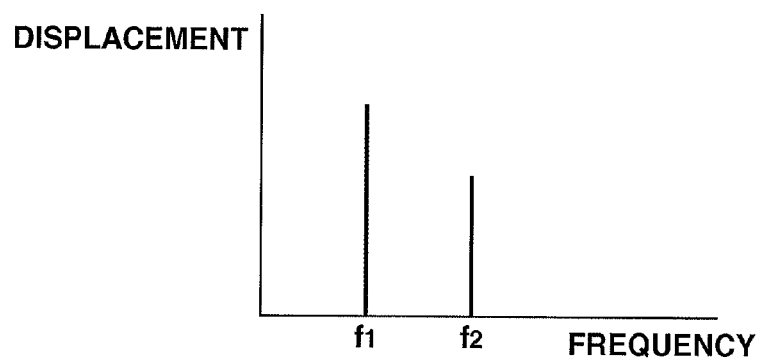
FIG. 8B is a view illustrating two frequencies of displacements of the detecting portion in the fourth embodiment.

FIG. 8A illustrates changes with time in application conditions of driving force 257 and driving force 258, and a displacement in Y-axis direction of detecting electrode in the fourth embodiment. As shown in FIG. 8B, when frequency separation of the above displacement of the detecting electrode is executed, peaks of amplitude appear near frequencies $f_1$ and $f_2$ of driving forces 257 and 258. The calculated amplitude is the detection result of angular velocity. Thus, angular velocities about two axes can be divided into separable forms by the frequency separation performed in the output data controlling portion 4011.

As described in the foregoing, in this embodiment, the controlling portion 401 includes the output data controlling portion 4011 and the drive controlling portion 4012. And, the drive controlling portion excites first and second reference oscillations at different frequencies, and the output data controlling portion divides signals of angular velocities about two axes into separable forms by the frequency separation. The controlling portion 401 divides signals, respectively corresponding to displacements caused by first and second Coriolis' forces and detected by the displacement detecting portion, into separable forms, and separately obtains signals of angular velocities about first and second axes.

According to this embodiment, angular velocities about two axes can be continuously detected. This embodiment is different from the third embodiment in that division of angular velocities about two axes is executed by the frequency separation.

The data controlling portion 4011 can be constructed using a means for performing the Fourier transform. Division of angular velocities about two axes can be executed without degradation of signals by using the Fourier transformer. Further, the data controlling portion 4011 can also be constructed using a filter. By using the filter, division of signals can be achieved with a simple construction without using a calculating circuit. The detecting/dividing method (frequency separation method) of this embodiment and the detecting/dividing method (time sharing method) of the third embodiment can be used in combination. In this case, interference between oscillations occurring in two mass portions can be further reduced.

A fifth embodiment will be described. In this embodiment, a detecting portion 509 is rotatably supported. Further, directions of Coriolis' forces occurring in mass portions are coincident with tangential directions of a circle formed by connecting points at an equal distance from the rotational center of the detecting portion 509. The detecting portion 509 is rotated in the tangential direction, and a displacement of this rotation due to Coriolis' forces is detected.

Figure 9A:
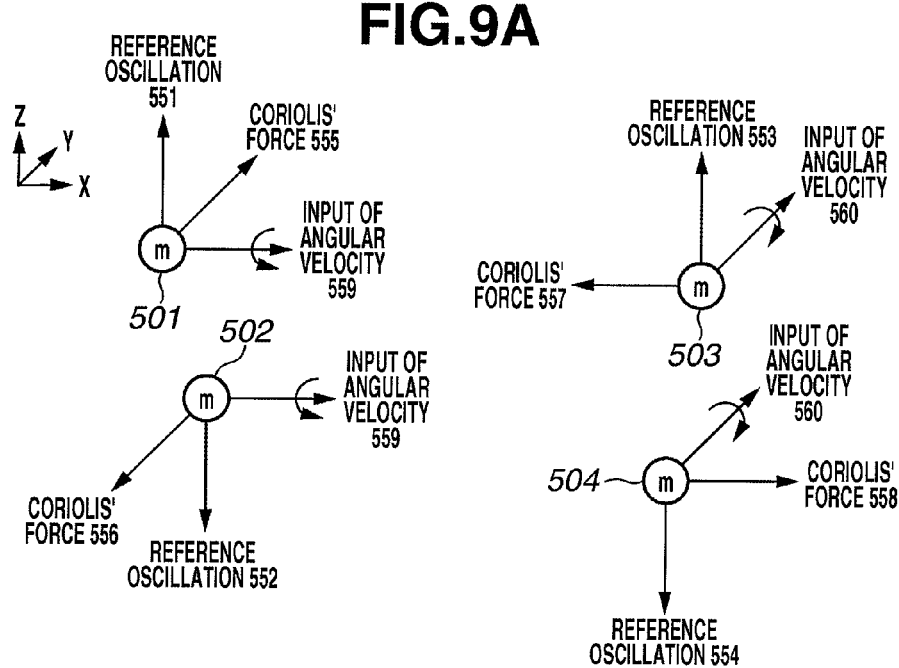
FIG. 9A is a view illustrating directions of reference oscillations, input of angular velocities, and Coriolis' forces in a fifth embodiment of a biaxial angular velocity sensor according to the present invention.

FIG. 9A illustrates directions of reference oscillation, input of angular velocity, and Coriolis' force in the fifth embodiment of a biaxial angular velocity sensor. In this embodiment, four mass pieces 501, 502, 503 and 504 are arranged. The mass piece 501 performs reference oscillation 551 in Z-axis direction, and Coriolis' force 555 in Y-axis direction occurs in the mass piece 501 in response to input of angular velocity 559 about X-axis. The mass piece 502 performs reference oscillation 552 in Z-axis direction with an inverse phase relative to the mass piece 501, and Coriolis' force 556 along Y-axis direction in an opposite direction to the mass piece 501 occurs in the mass piece 502 in response to input of angular velocity 559 about X-axis. The mass piece 503 performs reference oscillation 553 in Z-axis direction, and Coriolis' force 557 in X-axis direction occurs in the mass piece 503 in response to input of angular velocity 560 about Y-axis. The mass piece 504 performs reference oscillation 554 in Z-axis direction with an inverse phase relative to the mass piece 503, and Coriolis' force 558 along X-axis direction in an opposite direction to the mass piece 503 occurs in the mass piece 504 in response to input of angular velocity 560 about Y-axis.

A first mass portion is comprised of mass pieces 501 and 502. A second mass portion is comprised of mass pieces 503 and 504.

To sum up for each axis, Z-axis is the oscillation direction of all reference oscillations. X-axis (first axis) is an axis of input of angular velocity 559 for reference oscillation 1 (551) and reference oscillation 2 (552), and a generation direction of Coriolis' forces 557 and 558 for reference oscillation 3 (553) and reference oscillation 4 (554). Y-axis (second axis) is an axis of input of angular velocity 560 for reference oscillation 3 (553) and reference oscillation 4 (554), and a generation direction of Coriolis' forces 555 and 556 for reference oscillation 1 (551) and reference oscillation 2 (552). Here, reference oscillation 1 (551) and reference oscillation 2 (552) are the first reference oscillation, and reference oscillation 3 (553) and reference oscillation 4 (554) are the second reference oscillation.

Figure 9B:
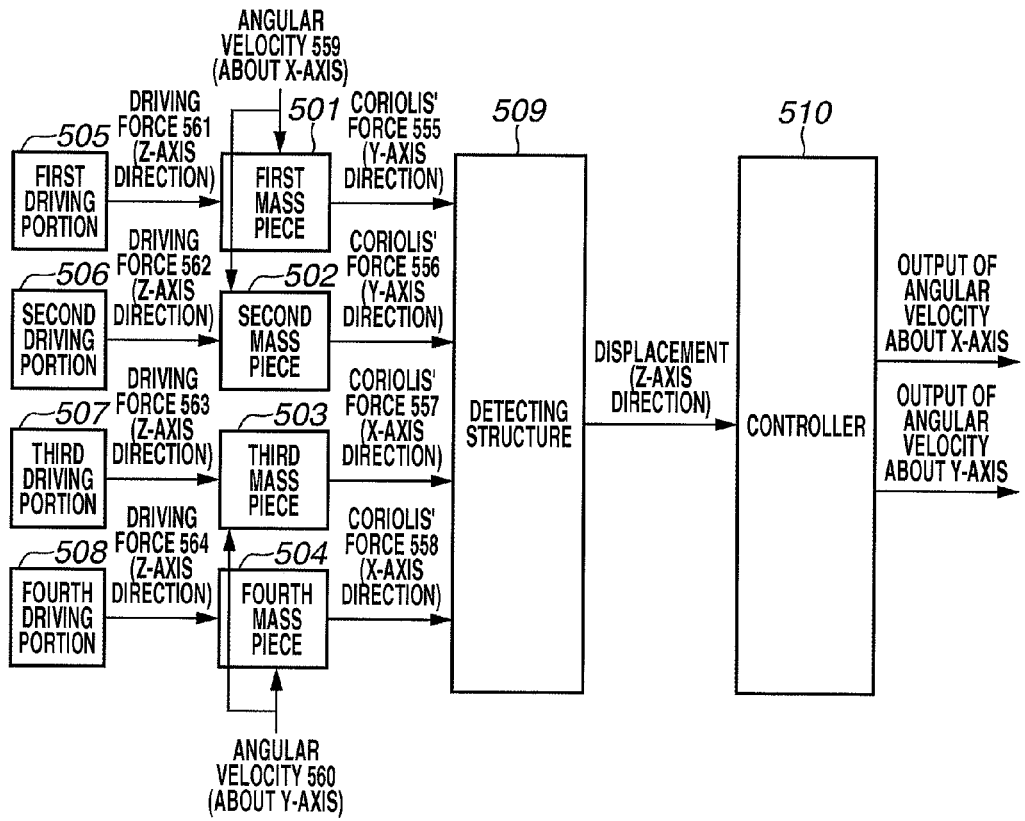
FIG. 9B is a block diagram illustrating the construction of the fifth embodiment.

FIG. 9B illustrates the construction of this embodiment. Reference oscillations in Z-axis (third axis) direction of mass pieces 501, 502, 503 and 504 are excited by driving forces 561, 562, 563 and 564 from driving portions 505, 506, 507 and 508, respectively. Upon input of angular velocity 559 about X-axis and angular velocity 560 about Y-axis, Coriolis' forces 555, 556, 557 and 558 occur in respective mass pieces, and these Coriolis' forces act on the detecting portion 509.

Figure 9C:
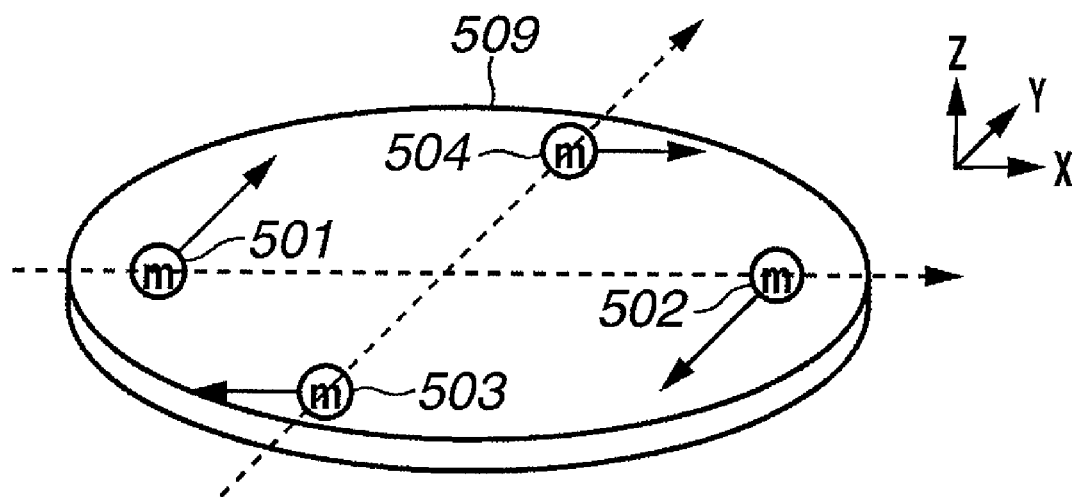
FIG. 9C is a perspective view illustrating mass portions arranged on a detecting portion of the fifth embodiment.

FIG. 9C illustrates the arrangement of mass pieces 501, 502, 503 and 504 on the detecting portion 509 in the fifth embodiment. On the detecting portion 509, mass pieces 501 and 502 are arranged on X-axis sandwiching the center of a circular plate therebetween. Further, mass pieces 503 and 504 are arranged on Y-axis sandwiching the center of the circular plate therebetween. A spring for reference oscillation of each mass piece is designed to be resilient only in Z-axis direction, so that Coriolis' force appearing in each mass piece acts along the tangential direction of the circle formed by connecting points at an equal distance from the rotational center of the detecting portion 509. As a result, a direction of displacement of the detecting portion 509 is a rotational direction about the rotational center. This displacement about Z-axis is detected, and division of the detected signals is performed by a controlling portion 510. Thus, magnitudes of angular velocities about two axes can be separately detected.

Different from the first and second embodiments, the generation direction of Coriolis' force is caused to be coincident with the above-described tangential direction in this embodiment. Thus, the action direction of Coriolis' force is coincident with the tangential direction. A preferable construction of this embodiment will be described with reference to FIG. 10.

Figure 10A:
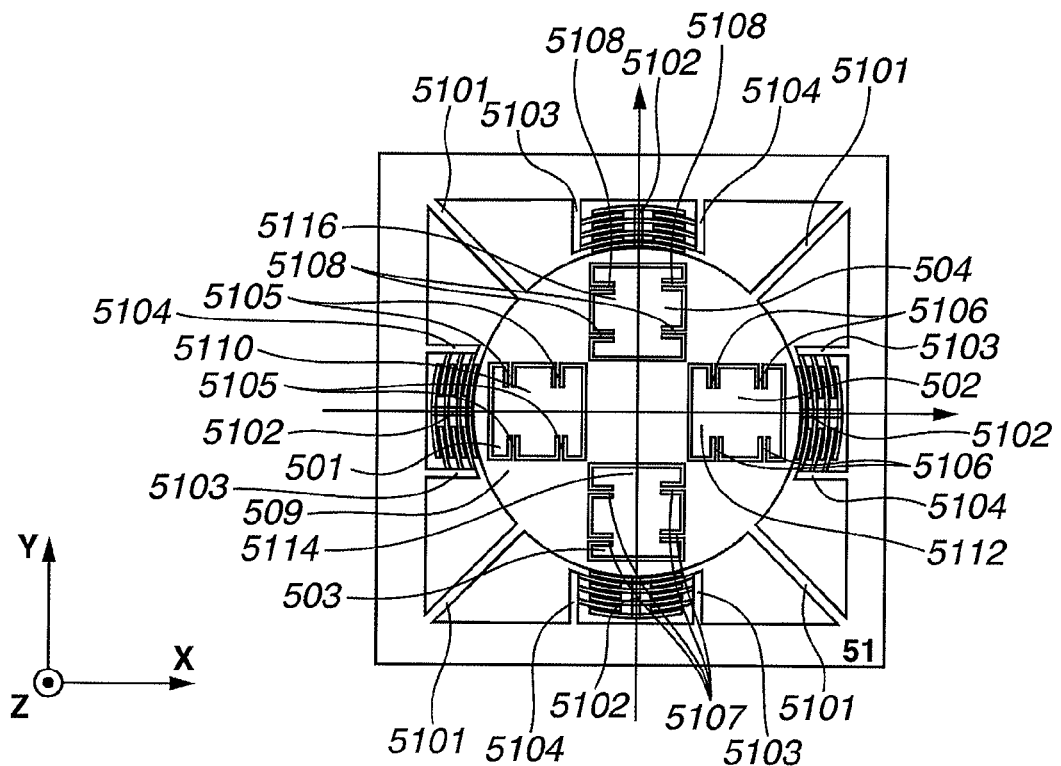
FIG. 10A is a plan view illustrating disassembled portions in a preferable construction of the fifth embodiment.
Figure 10B:
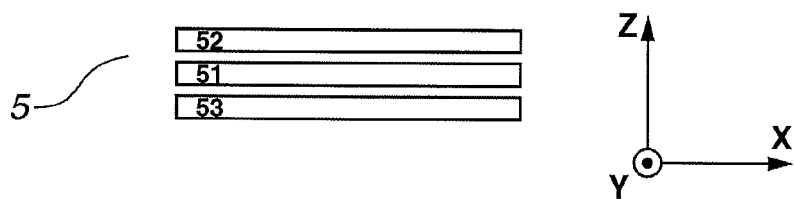
FIG. 10B is a view illustrating substrates in FIG. 10A arranged along a Z-axis direction.
Figure 11A:
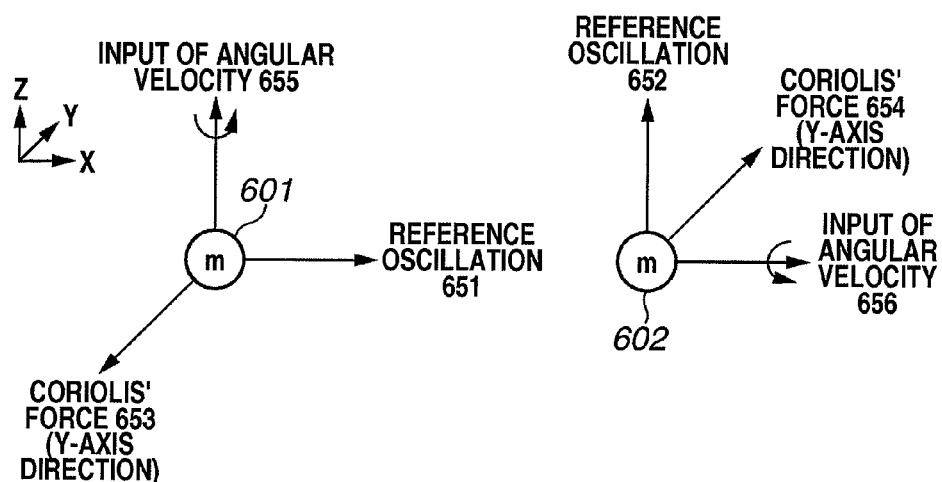
FIG. 11A is a view illustrating directions of reference oscillations, input of angular velocities, and Coriolis' forces in a conventional biaxial angular velocity sensor.
Figure 11B:
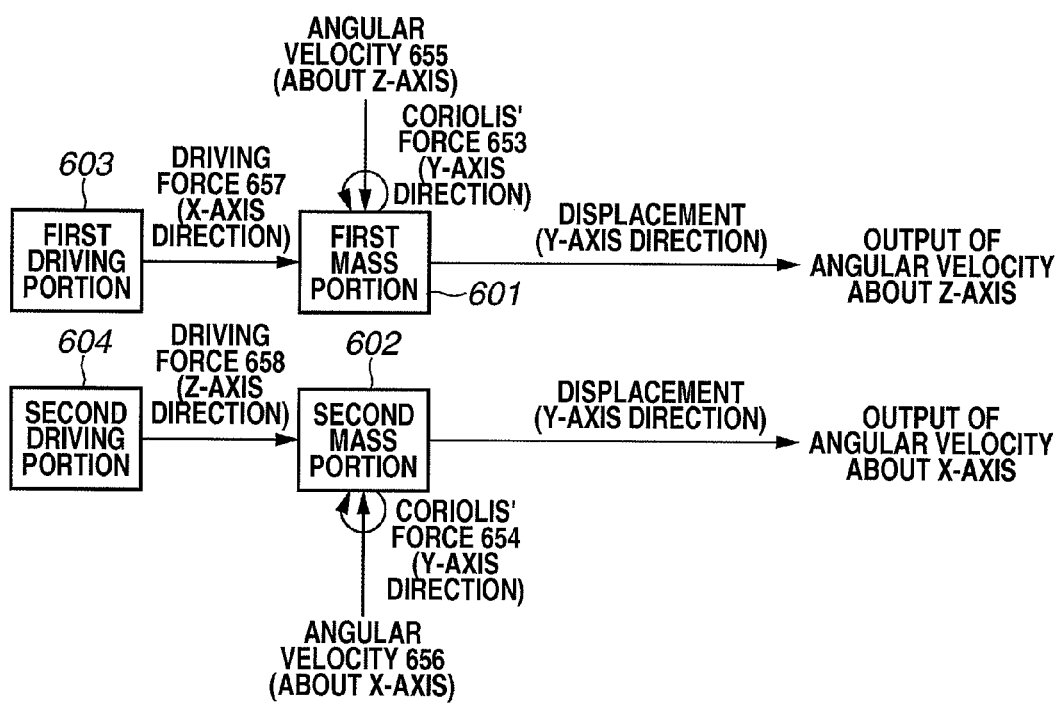
FIG. 11B is a block diagram illustrating the construction of the conventional angular velocity sensor of FIG. 11A.
Figure 11C:
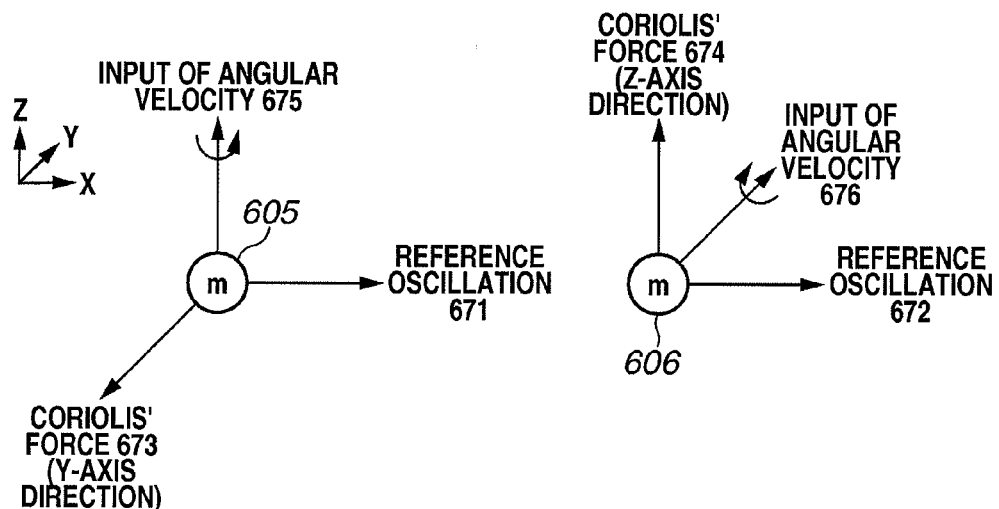
FIG. 11C is a view illustrating directions of reference oscillations, input of angular velocities, and Coriolis' forces in another conventional biaxial angular velocity sensor.
Figure 11D:
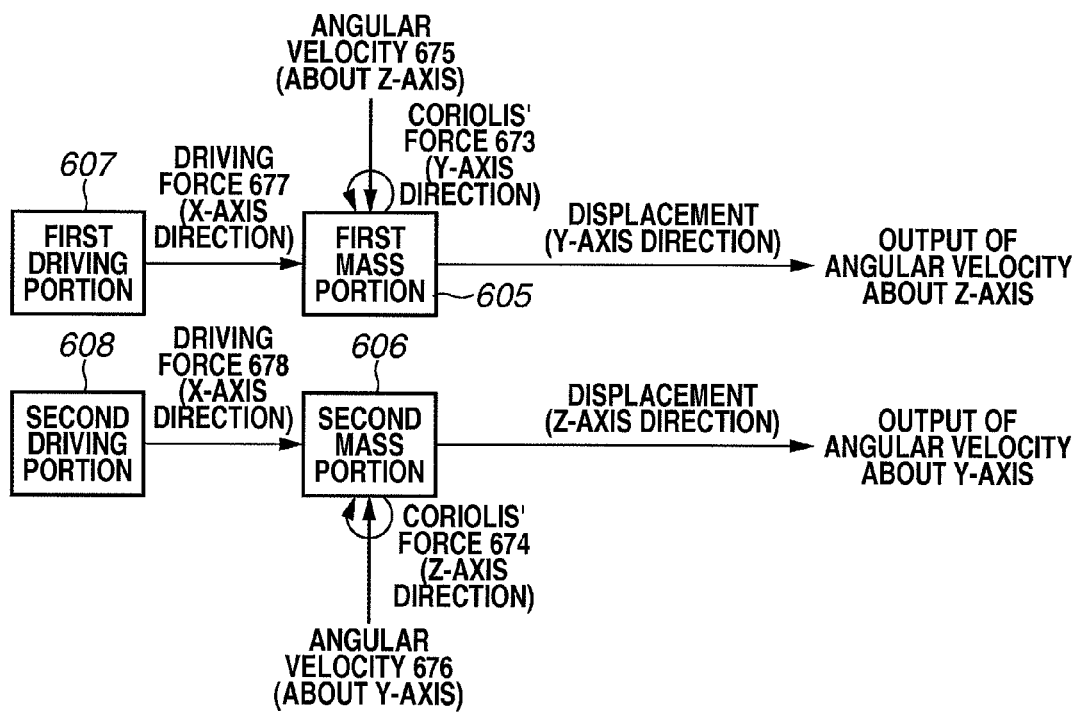
FIG. 11D is a block diagram illustrating the construction of the conventional angular velocity sensor of FIG. 11C.

FIG. 10A illustrates a preferable construction of the fifth embodiment. FIG. 10B illustrates the arrangement in Z-axis direction of supporting substrates 51, 52 and 53 illustrated in FIG. 10A. In a biaxial angular velocity sensor 5 of this embodiment, the detecting portion 509 is movably supported by the supporting substrate 51 through springs 5101. The detecting portion 509 is a circular plate in which movable comb-tooth electrodes 5102 are provided for acquiring the displacement in a rotational direction. In contrast, the supporting substrate 51 is provided with electrodes (stationary comb-tooth electrodes) 5103 and 5104 facing the movable comb-tooth electrodes 5102. Further, the detecting portion 509 is provided with first mass piece 501, second mass piece 502, third mass piece 503 and fourth mass piece 504 supported by springs 5105, 5106, 5107 and 5108 resilient in Z-axis direction while stiff in other directions, respectively.

Mass pieces 501 and 502 have an equal mass, and are arranged on X-axis equi-distantly from the rotational center of the circular plate. Similarly, mass pieces 503 and 504 have an equal mass, and are arranged on Y-axis equi-distantly from the rotational center of the circular plate.

The first mass piece 501 has a movable electrode 5110 on its upper surface, and a movable electrode (not shown) on its lower surface. The movable electrode 5110 and movable electrode (not shown) generate driving force 561 in Z-axis direction in cooperation with stationary electrodes 521 and 531 disposed on a lower surface of the supporting substrate 52 and an upper surface of the supporting substrate 53, respectively. Two movable electrodes 5110 (only one is shown) on the first mass piece 501 and stationary electrodes 521 and 531 are generally referred to as a driving portion 1 (505).

The second mass piece 502 has a movable electrode 5112 on its upper surface, and a movable electrode (not shown) on its lower surface. The movable electrode 5112 and movable electrode (not shown) generate driving force 562 in Z-axis direction in cooperation with stationary electrodes 522 and 532 disposed on a lower surface of the supporting substrate 52 and an upper surface of the supporting substrate 53, respectively. Two movable electrodes 5112 (only one is shown) on the second mass piece 502 and stationary electrodes 522 and 532 are generally referred to as a driving portion 2 (506). A first driving portion is comprised of driving portion 1 (505) and driving portion 2 (506).

Likewise, the third mass piece 503 has a movable electrode 5114 on its upper surface, and a movable electrode (not shown) on its lower surface. The movable electrode 5114 and movable electrode (not shown) generate driving force 563 in Z-axis direction in cooperation with stationary electrodes 523 and 533 disposed on a lower surface of the supporting substrate 52 and an upper surface of the supporting substrate 53, respectively. Two movable electrodes 5114 (only one is shown) on the third mass piece 503 and stationary electrodes 523 and 533 are generally referred to as a driving portion 3 (507).

The fourth mass piece 504 has a movable electrode 5116 on its upper surface, and a movable electrode (not shown) on its lower surface. The movable electrode 5116 and movable electrode (not shown) generate driving force 564 in Z-axis direction in cooperation with stationary electrodes 524 and 534 disposed on a lower surface of the supporting substrate 52 and an upper surface of the supporting substrate 53, respectively. Two movable electrodes 5116 (only one is shown) on the fourth mass piece 504 and stationary electrodes 524 and 534 are generally referred to as a driving portion 4 (508). A second driving portion is comprised of driving portion 3 (507) and driving portion 4 (508).

In the biaxial angular velocity sensor having the above-described construction, when angular velocities are detected, changes in electrostatic capacity between movable comb-tooth electrode 5102 and stationary electrodes 5103 and 5104 are detected. Thereby, information of a change in displacement in the rotational direction about Z-axis can be obtained.

Mass pieces 501 and 502 are driven with mutually inverse phases by driving portions 505 and 506, respectively. Thus, Coriolis' force in the tangential direction of the detecting portion 509 occurs in response to input of angular velocity 559 about X-axis. Further, mass pieces 503 and 504 are driven with mutually inverse phases by driving portions 507 and 508, respectively. Thus, Coriolis' force in the tangential direction of the detecting portion 509 occurs in response to input of angular velocity 560 about Y-axis. Hence, electrostatic capacity between movable comb-tooth electrode 5102 and stationary electrodes 5103 and 5104 changes. The change in electrostatic capacity is detected, and displacement in the rotational direction about Z-axis is detected. As a result, magnitude of Coriolis' force can be detected.

Thereafter, angular velocities 559 and 560 about axes are divided into separable forms, and obtained by the controlling portion 510 similar to the first and second embodiments.

In this embodiment, it is preferable to provide a pair of mass pieces for generating Coriolis' forces of the same magnitude in opposite directions, on opposite sides sandwiching the rotational center of the detecting portion 509 therebetween. The reason therefor is that the sum of forces in X-axis and Y-axis directions can be made zero, and only a moment about Z-axis can be given to the detecting portion 509. In this embodiment, two mass pieces with the same mass are arranged symmetrically about the rotational center of the detecting portion 509. However, such a structure is not always necessary, and any structure can be used so long as magnitudes of Coriolis' forces are equal. In other words, other constructions can be adopted in which there are provided first and second mass portions comprised of mass pieces for making it possible to generate Coriolis' force with the same magnitude by adjustment of position of the mass piece from the rotational center of the detecting portion 509, or adjustment of amplitudes of reference oscillations.

As described in the foregoing, in this embodiment, the detecting portion 509 includes the first mass portion disposed on the first axis (X-axis) and supported movably in the third axis (Z-axis) direction, and the second mass portion disposed on the second axis (Y-axis) and supported movably in the third axis direction. And, the free direction (a direction of one-dimensional degree of freedom) of the detecting portion is a direction about the third axis different from first and second axes.

More specifically, first and second mass portions include plural mass pieces (in the above construction, first and second mass pieces, and third and fourth mass pieces), respectively. And, first and second mass portions include mass pieces for generating equivalent Coriolis' forces, on two mutually orthogonal axes with the rotational center of the detecting portion being an origin, respectively. These mass pieces are arranged sandwiching the other of the orthogonal axes therebetween. Further, the above mass pieces perform oscillations with mutually inverse phases, respectively.

In this embodiment, pairs of mass pieces are arranged on two mutually orthogonal axes, respectively. However, similar to the second embodiment, two arbitrary axes can be selected on a plane perpendicular to Z-axis, and pairs of mass pieces can be disposed on these axes, respectively.

According to this embodiment, degree of contribution to the rotation of the detecting portion by each mass piece can be changed by adjusting the position of each mass piece from the center of the detecting portion 509 or mass of each mass piece. When two pairs of mass pieces are driven at different frequencies, Coriolis' forces therefrom act on the detecting portion 509 at these frequencies, respectively. Therefore, depending on characteristics of the spring 5101 supporting the detecting portion 509, there is a possibility that sensitivities to angular velocities about two axes are largely different. In this embodiment, these sensitivities can be made approximately equal to each other by adjusting the position of each mass piece from the center of the detecting portion 509. This is desirable from the view point of detection resolution. In the second embodiment, sensitivities to angular velocities about two axes can be made approximately equal to each other by adjusting the size of each mass portion.

Furthermore, it is possible to change the amplitude of reference oscillation of the mass portion or mass piece so that sensitivity can be adjusted for each input axis of angular velocity. Further, it is possible to increase Coriolis' force and improve sensitivity by increasing the speed of driving force for generating reference oscillation of the mass portion. For this purpose, an adjusting block for adjusting the driving force only needs to be arranged on the driving portion, for example. Similarly, in order to adjust sensitivity to the input axis, the size of the mass portion can be changed. As mass of the mass portion increases, Coriolis' force increases. Therefore, sensitivity can be improved by arrangement of a large mass. According to the above configuration, sensitivities to angular velocities about two axes can be readily made approximately equal to each other.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-037619, filed Feb. 19, 2008, which is hereby incorporated by reference herein in its entirety.

What is claimed is:

1. An angular velocity sensor comprising:
a supporting substrate;
a detecting portion configured to be supported by the supporting substrate movably in at least a free direction;
a displacement detecting portion configured to detect a displacement of the detecting portion in the free direction;
a first driving portion configured to excite a first reference oscillation of at least a portion of the detecting portion so that a first Coriolis' force in the free direction is generated in response to an angular velocity about a first axis; and
a second driving portion configured to excite a second reference oscillation of at least a portion of the detecting portion so that a second Coriolis' force in the free direction is generated in response to an angular velocity about a second axis different from the first axis,
wherein the second driving portion excites the second reference oscillation so that the second Coriolis' force is separable from the first Coriolis' force, and the angular velocity sensor further comprises a controlling portion configured to separate a signal detected by the displacement detecting portion into two signals which correspond to displacements of the detecting portion caused by the first Coriolis' force and the second Coriolis' force, respectively, and thereby to acquire angular velocities about the first axis and the second axis.

2. An angular velocity sensor according to claim 1, wherein the free direction is a direction of a third axis different from the first axis and the second axis.

3. An angular velocity sensor according to claim 2, wherein the detecting portion is supported movably in a direction of the first axis and a direction of the second axis, and the detecting portion executes the first reference oscillation and the second reference oscillation respectively excited by the first driving portion and the second driving portion.

4. An angular velocity sensor according to claim 2, wherein the detecting portion includes a first mass portion supported movably in the direction of the second axis, and a second mass portion supported movably in the direction of the first axis, the first mass portion executes the first reference oscillation excited by the first driving portion, and the second mass portion executes the second reference oscillation excited by the second driving portion.

5. An angular velocity sensor according to claim 1, wherein the controlling portion includes an output data controlling portion and a drive controlling portion, and the output data controlling portion commands the drive controlling portion to excite the first reference oscillation and the second reference oscillation alternately, and acquires signals of angular velocities about the first and the second axes into mutually separable forms, using information of selectively excited reference oscillation.

6. An angular velocity sensor according to claim 1, wherein the controlling portion includes an output data controlling portion and a drive controlling portion, the drive controlling portion excites the first reference oscillation and the second reference oscillation at mutually different frequencies, and the output data controlling portion acquires signals of angular velocities about the first and the second axes into mutually separable forms, using a method of frequency separation.

7. An angular velocity sensor comprising:
a supporting substrate;
a detecting portion configured to be supported by the supporting substrate movably in at least a free direction;
a displacement detecting portion configured to detect a displacement of the detecting portion in the free direction;
a first driving portion configured to excite a first reference oscillation of at least a portion of the detecting portion so that a first Coriolis' force in the free direction is generated in response to an angular velocity about a first axis;
a second driving portion configured to excite a second reference oscillation of at least a portion of the detecting portion so that a second Coriolis' force in the free direction is generated in response to an angular velocity about a second axis different from the first axis wherein the detecting portion includes a first mass portion supported movably in the direction of a third axis different from the first axis and the second axis and arranged on the first axis, and a second mass portion supported movably in the direction of the third axis and arranged on the second axis, and the free direction of the detecting portion is a tangential direction about the third axis.

8. An angular velocity sensor according to claim 7, wherein each of the first mass portion and the second mass portion includes a pair of mass pieces, and the pair of mass pieces have an equal mass and are arranged equi-distantly from a rotational center of the detecting portion to generate Coriolis' forces of the same magnitude.

9. An angular velocity sensor according to claim 8, wherein the pair of mass pieces perform oscillations with mutually inverse phases.

10. An angular velocity sensor according to claim 7, wherein the controlling portion includes an output data controlling portion and a drive controlling portion, and the output data controlling portion commands the drive controlling portion to excite the first reference oscillation and the second reference oscillation alternately, and acquires signals of angular velocities about the first and the second axes into mutually separable forms, using information of selectively excited reference oscillation.

11. An angular velocity sensor according to claim 7, wherein the controlling portion includes an output data controlling portion and a drive controlling portion, the drive controlling portion excites the first reference oscillation and the second reference oscillation at mutually different frequencies, and the output data controlling portion acquires signals of angular velocities about the first and the second axes into mutually separable forms, using a method of frequency separation.

\* \* \* \* \*